Aug. 21, 1934.  F. EISENACH  1,971,034

GEAR

Filed March 31, 1932  4 Sheets-Sheet 1

Inventor.

Aug. 21, 1934.   F. EISENACH   1,971,034

GEAR

Filed March 31, 1932   4 Sheets-Sheet 2

Inventor.

Aug. 21, 1934.　　　F. EISENACH　　　1,971,034
GEAR
Filed March 31, 1932　　　4 Sheets-Sheet 3
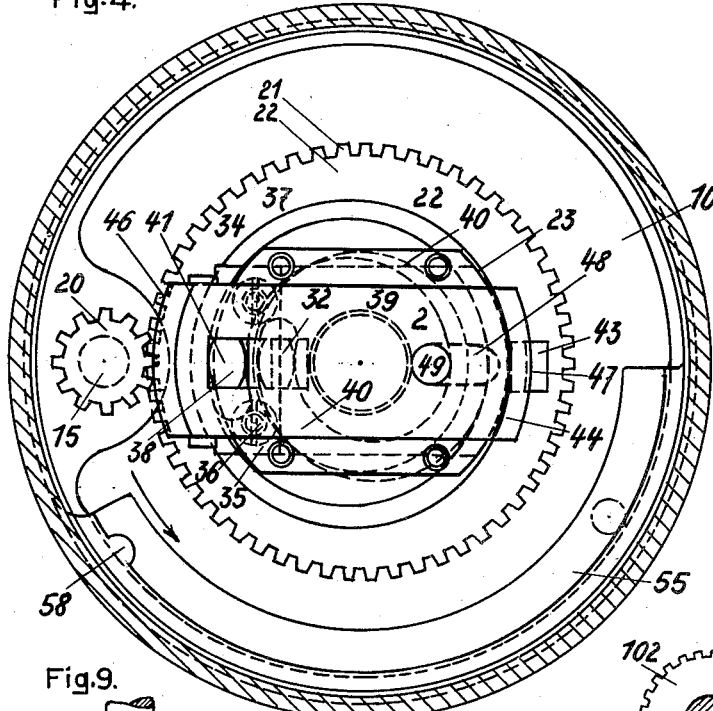

Aug. 21, 1934.     F. EISENACH     1,971,034
GEAR
Filed March 31, 1932      4 Sheets-Sheet 4

Inventor.

Patented Aug. 21, 1934

1,971,034

UNITED STATES PATENT OFFICE 1,971,034

GEAR

Fritz Eisenach, Dresden, Germany, assignor of two-thirds to Gustav Seitz and Alfred Brückner, both of Dresden, Germany Application March 31, 1932, Serial No. 602,317

6 Claims. (Cl. 74—54)

This invention relates to a gear capable of regulation without gradation.

Gears of this type, in which transmitting members provided with displaceable laminated segments are employed, are known already, but all of them suffer from the drawback that they do not permit regulation of speed ranging from zero to a maximum. Furthermore, it is impossible to effect reliable braking by means of the gears themselves.

The invention provides a gear without gradation whose driving shaft drives a crank the lever arm of which may be varied from zero to its greatest possible length. At the point of application of the lever arm a transmission wheel is loosely arranged which rotates over a toothed rim which is varied according to the variation of the length of the lever arm by means of segments and their radial displacement. The invention is applied to a planet gear with internal gearing, though it could be used also in connection with external gearing. When the crank is driven the transmission wheel rolls over the segments and transmits its rotation to a driven shaft.

It lies within the scope of the invention to provide for the rotation of the radially adjustable segments on a stationary transmission wheel which is radially adjustable to the driving shaft only.

The variation of the toothed rim formed by the segments requires a corresponding change in the gearing of the transmission wheel, which is effected by means of adjustable laminated segments taking the place of stationary teeth and radially displaceably arranged in a wheel body.

Figure 1:
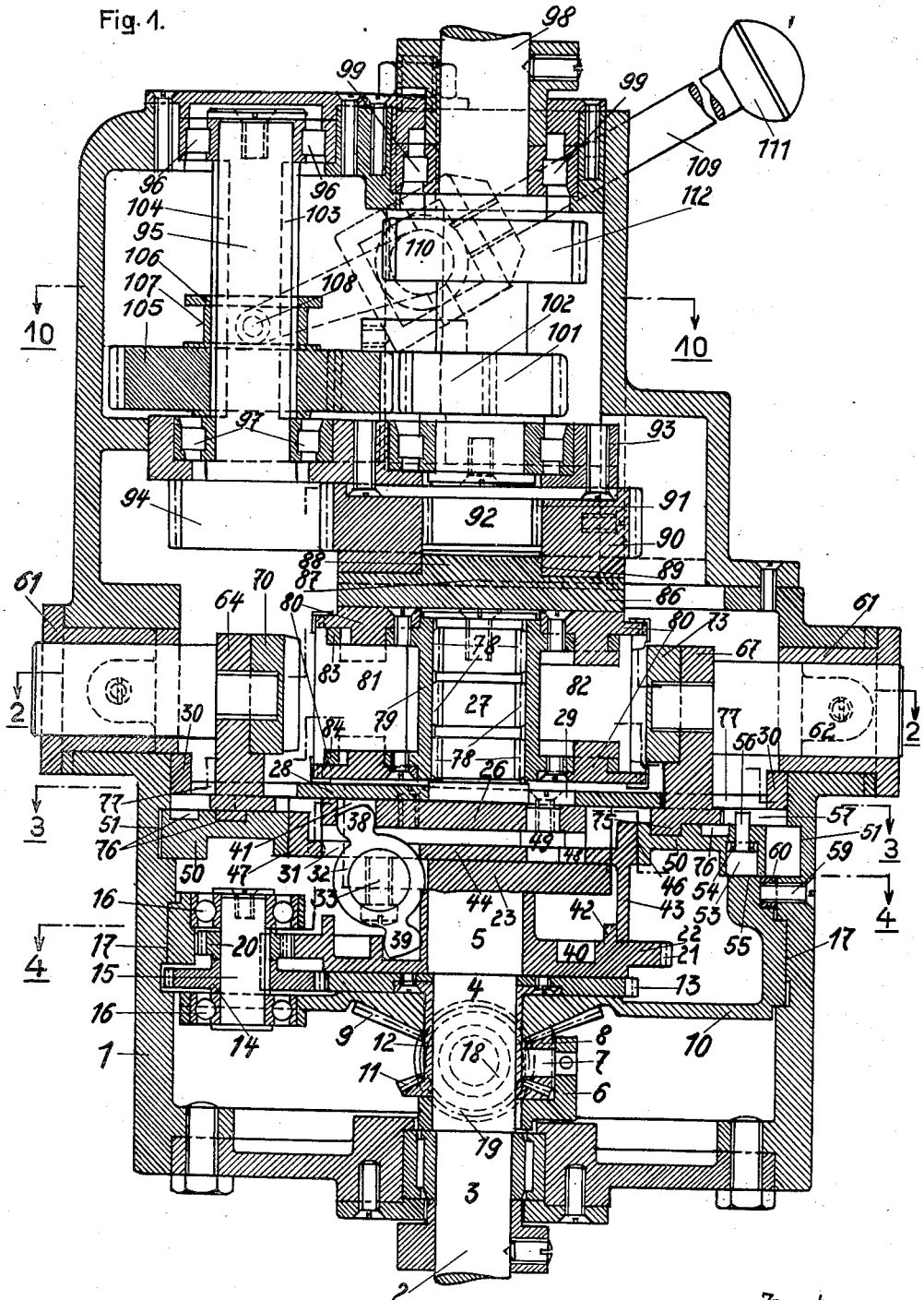
Figure 2:
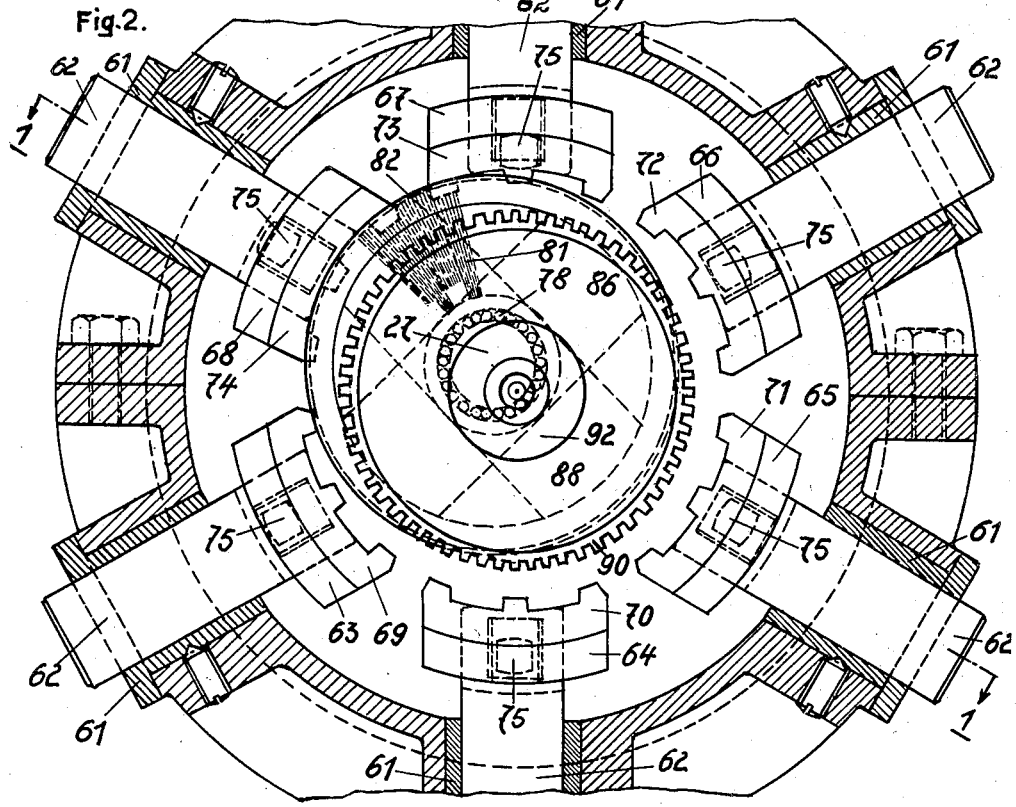
Figure 3:
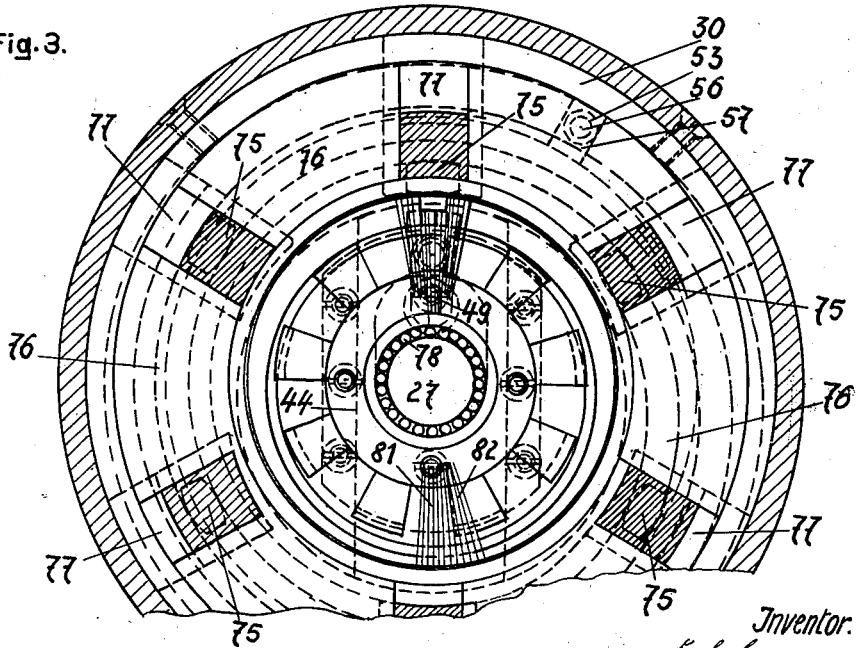
Figure 11:
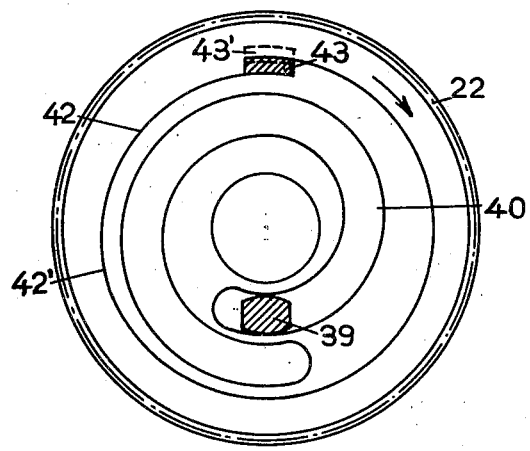
Figure 12:
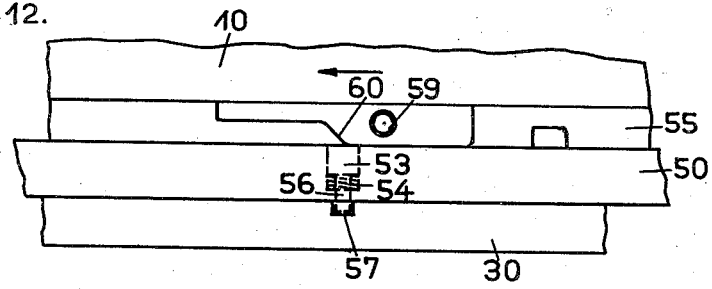
Figure 13:
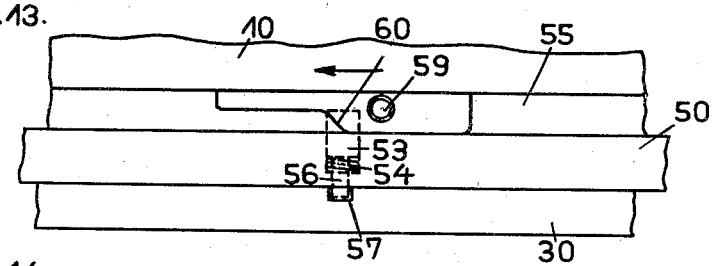
Figure 14:
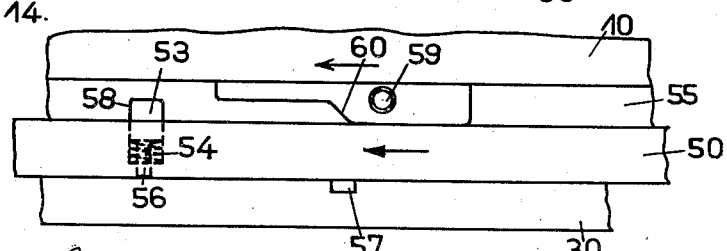

By way of example, the invention is illustrated in the accompanying drawings, in which Figure 1 is a longitudinal section of the gear on the line 1—1 of Fig. 2; Figs. 2, 3 and 4 are cross sections of the gear on the lines 2—2, 3—3 and 4—4 of Fig. 1; Fig. 5 is a longitudinal section of another construction of the adjusting members; Figs. 6, 7 and 8 are front and side views of laminated segments in two constructional forms; Fig. 9 is a diagram of the intermediate bevel gears disposed in the adjusting disc; Fig. 10 is a diagram showing in section, the driven member on the line 10—10 of Fig. 1; Fig. 11 shows a cam for the link guide with curved surface for actuating a plate; and Figs. 12 to 14 show coupling positions of the adjusting disc and ring effected by a locking pin.

Referring to the drawings, the casing 1, Fig. 1, contains the driving shaft 2 having the collars 3, 4 and 5. The collar 4 has firmly keyed thereto a holder 6 provided with a pin 7 on which a bevel wheel 8 is loosely disposed which rotates over the conical wheel rim 9 of an adjusting disc 10 loosely seated on the shaft 2. The wheel 8 is in mesh with a bevel gear 11 provided with the bush 12 which is loosely rotatable on the collar 4. The other end of the bush 12 carries a spur gear 13 which is in mesh with a companion gear 14 firmly keyed on to a shaft 15 running in the ball bearings 16 which are arranged on the edge of the adjusting disc 10 adjustably disposed in the guide groove 17 of the casing 1. The adjustment of the disc 10 is effected by means of the adjusting wheel 18 and the bevel gear 19 (Fig. 5) which engages the toothed rim 9.

The shaft 15 carries a keyed-on pinion 20 which is in mesh with the toothed rim 21 of a cam 22 which is loosely rotatable on the collar 5 of the driving shaft to the end of which a link guide 23 is secured which has grooves 24, 25 for a link 26 in the center of which a pin 27 is provided. The link 26 is firmly connected with a disc 28 having a recess 29 and rotating in a bush collar 30 secured to the casing 1.

The link guide 23 has a longitudinal slot 31 for a control lever 32 which is disposed so as to rotate about a bolt 33, the ends of the bolt forming the pads 34 and 35 and being secured to the link guide 23 by the screws 36 and 37. The control lever 32 is fitted with two oppositely arranged noses 38, 39, one of which engages a spiral groove 40 of the cam 22 and the other a depression 41 in the link 26.

The cam 22 is provided with a curved surface 42 at whose outer edge the nose 43 engages a plate 44 which is displaceably disposed in a recess 45 of the link guide 23 and provided with the circular slide surfaces 46, 47 whose center of curvature coincides with the center of the plate 44. The plate has also a slot 48 engaged by a bolt 49 secured to the link 26, and loosely rotates in a ring 50 which is rotatably and displaceably disposed in a guide groove 51 of the casing 1.

Fig. 11 shows the nose 43 of the plate 44 in zero position. If the cam 22 moves in the direction of the arrow, the nose 43 of the plate 44 is moved out radially by the curved surface 42. If the cam 22 is moved so that the point 42' has proceeded up to the nose 43, the latter will be in the position 43' and the plate 44 in concentric position like the ring 50 guided on the plate and actuating the segments. From the point 42' the curved surface 42 extends into a concentric circle, so that during further rotation of the cam 22 the plate 44 and ring 50 remain in concentric position.

At the edge of the ring 50 a locking pin 53 is provided which is pressed against the ledge 55 of the adjusting disc 10 by the compression springs 54 and which engages, with its member 56, a recess 57 of the bush collar 30, the recess being dimensioned so as to permit radial displacement of the ring 50 with its locking pin within certain limits and prevent accidental driving of the ring 50 by the plate 44. As indicated in Fig. 12, if the adjusting disc 10 is turned in the direction of the arrow, two stops provided on the disc 10 and the ring 50 will be in contact with one another in this position and thus drive the ring 50 whereby the locking pin 53, owing to the action of the spring 54, will glide on the slide 60 secured to the casing 1 by the bolt 59. At this moment a notch 58 of the disc 10 will be opposite the locking pin 53, as shown in Fig. 13, which during further rotation of the disc 10 will engage this notch whereby the ring 50 and the bush collar 30 are disconnected and a rigid connection is established between the ring 50 and the adjusting disc 10, as indicated in Fig. 14. This connection will last as long as the eccentricity of the crank is greater than the tooth depth. If this eccentricity is smaller than the tooth depth, i. e., if eccentricity of the segments takes place, the ring 50 will be coupled with the bush collar 30.

In the center of the gear casing 1 six bushes are provided within which the guide bolts 62 for the toothed rim segments are radially displaceably arranged comprising the segment carriers 63—68 and the toothed rims 69—74 firmly disposed thereon. Each segment carrier has a guide nose 75 engaging the guide spiral 76 of the ring 50. The segments slide in radially extending guide slots 77 of the bush collar 30 firmly connected with the casing 1.

The pin 27 carries bearings 78 in which the transmission wheel 79 is loosely rotatably arranged, the wheel comprising the body 80 in which the conical laminæ 81, 82 are radially displaceable. The conically shaped conical laminæ 81, 82 form groups of the same type and are doubly arranged, as shown in Figs. 6, 7 and 8, in correspondingly constructed chambers of the body 80. These segments are pressed down by the radially displaceable rim segments 69 to 74 and pressed out again so as to be in operative position by the rings 83, 84 arranged in the body 80.

The front side of the transmission wheel 79 discloses a longitudinal slot 85 which is engaged by the guide ledge 86 of the Poulham disc 87. On the other side of the disc 87, rectangularly to the guide ledge 86, a ledge 88 is disposed which slides in a guide groove 89 of a driven gear 90 which is loosely rotatable about the journal 92 in the pin bearing 91, which is firmly arranged in the web 93 secured to the case 1. The rim of the driven gear is in mesh with the spur gear 94 forming the head of the intermediate shaft 95 resting in the roller bearings 96, 97 of the casing 1.

The driven shaft 98 (Fig. 10) whose central axis coincides with that of the driving shaft 2 runs in the roller bearings 99, 100 in the casing 1. The shaft 98 carries a keyed-on spur gear 101 which is in mesh, by means of the intermediate wheel 102, with a feed gear wheel 105 sliding in key-ways 103, 104 and being longitudinally displaceable on the intermediate shaft 95. The wheel 105 has a boss 106 the groove 107 of which is engaged by the slide roll 108 of a control lever 109. The lever 109 oscillates about the shaft 108 and has a handle 111. Another spur gear 112 is disposed near the spur gear 101 from which it is separated for the width of the gear wheel 105.

Another construction of the gear parts around the driving shaft 2 is shown in Fig. 5.

On the link guide 23 is firmly arranged a disc 113 whose toothed rim 114 is in mesh, by means of the intermediate bevel gears 115, 116, Fig. 9, with a second bevel gear rim 118 on the cam 117 which, with its collar 119, is loosely arranged on the shaft 2 and possesses, like the cam 22 in the first embodiment described, a spiral groove 40 in which the nose 39 of the control lever 32 slides. To the adjusting disc 10 loosely disposed on the driving shaft 2 two shafts 120, 121 are secured on which the intermediate bevel gears 115, 116 are rotatably positioned.

The gear functions as follows: The link guide 23 on the shaft 2 acts as crank, and, since the link 26 slides therein with its pin 27, the point of application of the crank is radially adjustable. The pin 27 carries loosely the wheel 79 which, during turning of the crank, rolls over the segments 69—74 whose pitch circle varies with the enlargement or reduction of the crank radius, the radial adjustment of the wheel 79 and the rim segments 69—74 insuring rotation of the wheel 79 about its axis during turning of the crank.

The size of the crank radius and, correspondingly, that of the pitch circle formed by the toothed rim segments determines the angular velocity of the transmission wheel 79 which, at a certain crank radius, has to cover a certain distance in its rotation. If the crank radius is varied, the toothed rim formed by the segments 69—74 will be varied accordingly with the result that a greater or smaller angular velocity is imparted to the wheel 79.

As the rotation of the transmission wheel 79 is transmitted to the driven shaft 98 by suitable intermediate members, a variation in the speed of the transmission wheel 79 will have a regulating influence on speed.

When the lever arm, i. e., the link 26, has once been adjusted to a certain length, the device will work as follows: Owing to the rotation of the bevel gear 8 on the bevel gear rim 9 rotation is imparted to the bevel gear 11 and to the spur gear 13 firmly connected therewith and in mesh with a companion gear 14 on the shaft 15. The wheel 14, together with the pinion 20, is firmly secured to the shaft 15 disposed in the adjusting disc 10 which is ordinarily not adjustable. The pinion 19 transmits the rotation to the toothed rim 21 of a cam 22 loosely arranged on the collar 5 of the driving shaft 2.

Owing to the firm connection of the driving shaft 2 and the link guide 23, the link 26, slidingly disposed in the guide, rotates also, as does the cam 22, the back gear having been chosen so that the cam 22 rotates at the same speed and in the same direction as the driving shaft. The same effect would be attained if both were firmly connected. Therefore, the control lever 32 secured in the link 26 rotates also, the ends of the lever forming the noses 38, 39 which are in engagement, respectively, with the cam 22 and the link 26.

When the speed is to be varied by an adjustment of the lever arm or link 26, the motion of the cam 22 relative to the driving shaft 2 will be accelerated or retarded. For this purpose the adjusting wheel 18 is rotated by hand and, by means of the bevel gear 19, rotation imparted to the adjusting disc 10, since the bevel gear 19 engages the bevel gear rim 9, so that this slight acceleration or retardation in speed caused by hand is imparted also to the companion wheel 14 and the pinion 20 driven by the shaft 2, as they are disposed in the adjusting disc 10 and are in mesh with the toothed rim 21. The result is additional motion imparted to the rim 21 and thus to the cam 22, so that, as stated above, relative motion takes place between the cam 22 and the driving shaft 2.

Since the control lever 32 is arranged firmly in the link guide 23 and thus retains the speed of the driving shaft 2, the nose 38 of the control lever 32, which engages the cam 22, cannot join in the specific rotation of the cam 22 caused by the variation in speed but slides in the spiral groove 40 of the cam 22 and causes rotation of the control lever 32 about the bolt 33 whereby the link 26 is displaced in the groves 24, 25 of its guide 23. In this manner the length of the lever arm of the gear crank is adjusted and, simultaneously, the speed of the driven shaft 98 regulated.

The other constructional form of the parts disposed around the driving shaft, as shown in Fig. 2, functions as follows:

The rotary motion of the driving shaft 2 is imparted to the link guide 23 of the disc 113 and its bevel gear rim 114 whose rotation, by means of the intermediate bevel gears 115, 116 loosely disposed on the shafts 120, 121 is transmitted to the bevel gear rim 118 of the cam 117, the gearing being chosen so that the rotation of the two rims 114, 117 takes place in the same direction and at the same speed. With the guide 23 rotates the control lever 32 whose adjustment for displacing the link 26 is effected by rotating the adjusting wheel 18 over and beyond the bevel gear 19 whereby this manually caused additional rotation is imparted also to the adjusting disc 10 by means of the bevel gear rim 9. The result is that the intermediate bevel gears 115, 116 loosely arranged on the shafts 120, 121 are moved, and the additional rotation of the bevel gears causes, by means of the bevel gear rim 118, a variation in the speed of the cam 117 relative to that of the driving shaft 2. Displacement of the cam 117 and thus, owing to the curved path 40, rotation of the control lever 32 take place whereby displacement of the link 26 is effected. The adjusting device shown in Fig. 2 acts therefore in the same manner as that disclosed in Fig. 1.

Corresponding to the link motion and the radial adjustment of the transmission wheel 79 loosely rotatably disposed on the pin 27, the segments 69—74 are radially adjustable so as to form toothed rims with a variable pitch circle.

In case the center line of the pin 27 coincides with the axis of the driving shaft 2 the lever arm formed by the link 26 will be equal to zero, that is, the transmission wheel 79 loosely disposed on the pin 27 does not rotate over the toothed rim segments but is blocked by them. It is then a case of a gear brake, i. e., the power of the driving shaft 2 is not transmitted to the driven shaft but the link pin 27 driven by the driving shaft loosely rotates in the transmission wheel.

The link 26 is radially adjusted by the rotation of the adjusting wheel 18. Within the guide 23 slides the plate 44 which, at each rotation of the adjusting wheel 18, moves radially outwardly to the same extent as the link 26, the motion being effected by means of the curved path 42 on the cam 22, which is engaged by the nose 43 of the plate 44. In zero position, that is, when the pin 27 forms an extension of the driving shaft 2, the plate 44 positioned in the guide 23 will be in its outermost eccentric position. As the plate 44 loosely rotates in the ring 50, it will, during its rotation, impart eccentric motion to the ring 50 arranged on it. Displacement of the ring 50 disposed in a guide groove 51 of the casing 1 is prevented by the locking bolt 53 whose lower end engages the bearing ring or bush collar 30. The eccentric motion of the ring 50 brings about alternate radial motion of the toothed rim segments 69—74 guided in the guide spiral 76 of the ring 50 in such a way that always the rim segment facing the crank is in mesh with the transmission wheel 79 while all other segments are not in engagement.

During further adjustment of the link 26 and the plate 44 the point is reached where the center of the plate 44 will coincide with the axis of rotation of the driving shaft 2. At this moment the eccentric motion of the plate 44 is zero, i. e., the plate rotates centrically in the ring 50 which for this reason does not move any more. Simultaneously, the rigid connection between the cam 50 and the bush collar 30 rigidly connected with the casing 1 ceases the moment the spring-actuated locking bolt 53 enters a notch 58 of the adjusting disc 10 whereby, on the other hand, a rigid connection is established between the cam 50 and the adjusting disc 10.

During still further adjustment the rotation of the disc 10 will cause rotation of the ring 50 rigidly connected therewith whose pivot is formed by the plate 44 which is in its centric position and maintains this position during continued adjustment of the disc 10 and the link 26, as the curved path 42, which ascends spirally at first, takes on circular form later on. This centric position is not interfered with by the motion of the bolt 49 connected with the link 26, as the bolt slides into a slot 48 of the plate 44 during radial motion of the link 26.

If the speed is to be reduced again, the steps described will be reversed. The spaces between the segments 69—74 and the link 26 will be reduced by means of the adjusting wheel 18 and, simultaneously, the slide 60 is guided towards the screw bolt 54 whereby finally disengagement between the adjusting disc 10 and the ring 50 is effected which, during continued adjustment, carries out a gradually growing eccentric motion. The return of the plate 44 and the ring 50 arranged around it to eccentric position takes place by means of the bolt 49 which is moved together with the link 26.

The motion of the wheel 79 is transmitted to the driven shaft in the following manner:

The rotary motion of the wheel 79 whose laminated segments 81, 82 depressed by the rims 69—74 are pressed again into operative position by the rings surrounding the wheel body 80 is transmitted by the disc 87 to the driven wheel 90 rotatably disposed on the web 93 of the casing 1 and thence to the intermediate shaft 95 by the spur gear 94. The shaft 95 carries the feed wheel 105, which is longitudinally displaceable in the keyways 103, 104 and can be displaced by the control lever 109 so as to come into engagement either with the spur gear 101, keyed on to the driven shaft 98, by the gear 102 or directly with the spur gear 112 to provide for forward and return motion. During idling the gear 105 is moved into the free space between 101, 112.

I claim:—

1. In a mechanical gear without gradation for regulating speed from zero up to a maximum combination with a driving shaft, of a crank in a casing at the end of the driving shaft, said crank having the form of a link guide, a link radially displaceable in said guide, a pin on said link, a transmission wheel loosely rotatably disposed on said pin, laminae on said transmission wheel, a plurality of toothed rim segments forming an internally toothed rolling path for said transmission wheel, said transmission wheel and rolling path forming a planetary gear.

2. In a mechanical gear according to claim 1 chambers in the transmission wheel, radially displaceable laminae of conical cross section in said chambers and rings for the radial outward movement of said laminæ.

3. In a mechanical gear without gradation for regulating speed from zero up to a maximum the combination with a driving shaft in a casing, of a crank at the end of the driving shaft, said crank having the form of a link guide, a recessed link in said guide, a pin at the end of said crank, said crank and pin being variable as to eccentricity, a transmission wheel loosely rotatably disposed on said pin, said pin and transmission wheel being firmly disposed on said link, laminæ on said transmission wheel, a plurality of toothed rim segments forming a rolling path for said transmission wheel, said rolling path and toothed rim segments forming a planetary gear, a disc and a cam loosely arranged on the driving shaft and adapted to adjust the eccentricity of said link and segments, said disc and cam being connected by a connecting and a differential gear, said cam having a spiral groove, a control lever disposed in said link guide and provided with noses, one of said noses engaging the spiral groove and the other nose the recess in said link to transmit rotation from the adjusting disc over said lever to said link for radial adjustment, means for displacing said segments radially to the axis of rotation, and means for transmitting the rolling motion of said wheel to a driven shaft.

4. In a mechanical gear according to claim 3 two bevel gears loosely rotatable on the adjusting disc, a toothed rim on the cam and a toothed rim on the link guide, said rims being in mesh with said bevel gears.

5. In a mechanical gear without gradation for regulating speed from zero up to a maximum the combination with a driving shaft in a casing, of a link guide acting as crank at the end of the shaft, a recessed link in said guide, a pin at the end of said crank, said crank and pin being variable as to eccentricity, a transmission wheel loosely rotatably disposed on said pin, said pin and transmission wheel being firmly disposed on said link, laminæ on said transmission wheel, a plurality of toothed rim segments forming a rolling path for said transmission wheel, said rolling path and toothed rim segments forming a planetary gear, a disc and a cam loosely arranged on the driving shaft and adapted to adjust the eccentricity of said link and segments, said disc and cam being joined by a connecting and a differential gear, said cam having a spiral groove, a control lever disposed in said link guide and provided with noses, one of said noses engaging the spiral groove and the other nose the recess in said link to transmit rotation from the adjusting disc over said lever to said link for radial adjustment, a slotted plate in the link guide having circular ends, a ring loosely positioned on the ends, a guide spiral on said ring, a nose on the segments engaging the spiral for radial adjustment, a nose on said plate, a curved surface provided on the cam and adapted to be engaged by said nose for radially moving said plate in one direction, a bolt on the link engaging the slot in said plate to cause radial motion thereof in opposite direction, means for displacing said segments radially to the axis of rotation, and means for transmitting the rolling motion of said wheel to a driven shaft.

6. In a mechanical gear according to claim 5 a coupling member adapted to temporarily connect the ring with a bush collar firmly attached to the casing or with the adjusting disc to cause eccentric motion of the segments if the eccentricity of the crank is smaller than the tooth depth and to provide for stationary arrangement of the segments if the eccentricity of the crank is greater than the tooth depth.

FRITZ EISENACH.